US006618746B2

(12) United States Patent
Desai et al.

(10) Patent No.: US 6,618,746 B2
(45) Date of Patent: *Sep. 9, 2003

(54) SURVEY COMMUNICATION ACROSS A NETWORK

(75) Inventors: Sohag H. Desai, Fremont, CA (US); Krishna Prabhakar, Fremont, CA (US)

(73) Assignee: MarketTools, Inc., Mill Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,331

(22) Filed: Mar. 30, 1998

(65) Prior Publication Data

US 2001/0052009 A1 Dec. 13, 2001

(51) Int. Cl.[7] .............................................. G06F 15/16
(52) U.S. Cl. ...................................... 709/204; 709/205
(58) Field of Search ................................ 709/203, 204, 709/302, 303, 304, 217, 205; 705/35, 10, 27, 50; 707/516, 513, 3; 706/60, 76, 54, 61, 46

(56) References Cited

U.S. PATENT DOCUMENTS

| | | | | |
|---|---|---|---|---|
| 5,517,405 A | * | 5/1996 | McAndrew et al. | 706/45 |
| 5,574,828 A | * | 11/1996 | Hayward et al. | 395/50 |
| 5,727,950 A | * | 3/1998 | Cook et al. | 434/350 |
| 5,810,599 A | * | 9/1998 | Bishop | 434/157 |
| 5,862,223 A | * | 1/1999 | Walker et al. | 705/50 |
| 5,873,049 A | * | 2/1999 | Bielak et al. | 702/6 |
| 5,879,163 A | * | 3/1999 | Brown et al. | 434/236 |
| 5,905,942 A | * | 5/1999 | Stoel et al. | 725/78 |
| 5,909,679 A | * | 6/1999 | Hall | 707/4 |
| 5,918,208 A | * | 6/1999 | Javitt | 705/2 |
| 5,920,856 A | * | 7/1999 | Syeda-Mahmood | 707/3 |
| 5,930,471 A | * | 7/1999 | Milewski et al. | 709/204 |
| 5,933,136 A | * | 8/1999 | Brown | 345/327 |
| 5,933,816 A | * | 8/1999 | Zeanah et al. | 705/35 |
| 5,948,054 A | * | 9/1999 | Nielson | 709/200 |
| 5,963,939 A | * | 10/1999 | McCann et al. | 707/4 |
| 5,963,951 A | * | 10/1999 | Collins | 707/102 |
| 5,966,695 A | * | 10/1999 | Melchione et al. | 705/10 |
| 5,974,446 A | * | 10/1999 | Sonnenreich et al. | 709/204 |
| 6,070,143 A | * | 5/2000 | Barney et al. | 705/8 |
| 6,093,026 A | * | 7/2000 | Walker et al. | 434/322 |
| 6,151,581 A | * | 11/2000 | Kraftson et al. | 705/3 |
| 6,189,029 B1 | * | 2/2001 | Fuerst | 709/217 |
| 6,256,614 B1 | * | 7/2001 | Wecker et al. | 705/14 |
| 2001/0052009 A1 | * | 12/2001 | Desai et al. | 709/224 |

OTHER PUBLICATIONS

Izhak Dar Kana, "Simple Adaptive Control—A Survey", ECE Dept. Drexel University, 5 pages.*
Mello Jr., "Survey Software Automates Electronic Polling", PC World May 1996, 1 page.*
Expertech press release, "PC–Based expert system shell has implement new features", 02/88, 3 pages.*
Powell, "Do–it–yourself survey software", Marketing computer, Feb. 1996, v16, n2, 3 pages.*
Weizenbum, Eliza, communication of the ACM vol. 9, pp. 36–45 (10), Jan. 1996.*
Whitehead, Auto –Faq, NCSA.UIUC.EDU/SDG/IT94 11 pages, 1994.*

* cited by examiner

*Primary Examiner*—Bunjob Jaroenchonwanit
(74) *Attorney, Agent, or Firm*—Davis Wright Tremaine LLP; Brian L. Johnson; Sheila Fox-Morrison

(57) ABSTRACT

A survey network system that allows gathering of information across a network quickly and efficiently, including a questionnaire server, a communication interface, a questionnaire distributor, a questionnaire designer and a questionnaire library.

28 Claims, 4 Drawing Sheets

SURVEY COMMUNICATION ACROSS A NETWORK

BACKGROUND OF THE INVENTION

1. Field of the Invention

The present invention relates generally to performing surveys and more particularly to survey communications across a network, such as the Internet/World-Wide-Web.

2. Description of the Background Art

Prior art systems and methods exist to perform surveys over a computer network, but such systems and methods provide limited capabilities in survey questioning and analysis. Many computer companies developed purely e-mail-based survey, distribution and analysis utility programs which were deployed during the time that computer networking was a relatively new technology before the World-Wide-Web (Web) gained popularity.

Prior art survey utility programs usually allow a designer to create a survey comprised of limited question types, such as multiple choice, fill-in-the-blanks, rating scale (with a maximum of two-dimensions), essay-type and ranking choice. Prior art surveys can be mailed to list of recipients, who can usually activate an attachment in their e-mail program, which brings up a client program that displays the survey. After responding to the survey, the survey takers send the responses to the e-mail box of the designer. The prior art usually analyzes the responses and looks for a proprietary tag, which identifies the survey and the response data, collates them and summarizes the responses. However, the prior art suffers from a number of limitations.

The prior art usually requires a client program to be launched from every survey respondent's desktop in order to display the survey and enable the respondent to reply. This is fine in a networked environment where every computer desktop has access to a server upon which the client program resides, but it can only work if every single potential respondent has had the client program distributed to their desktop. The prior art does not take advantage of the fact the Web browser has become a de facto "universal client"—it is ubiquitous on peoples' desktops.

Another limitation of the prior art is that it is tied to proprietary operating system environments.

Another limitation of the prior art is that it is usually tied to a proprietary windowing system environment.

Another limitation of the prior art is that it is not linked to a Web server or Web browser in any way. It cannot be associated with the Web, if required to make the survey distribution more targeted or more like a broadcast.

Another limitation of the prior art is that it has no capability of associating, delivering or receiving multimedia objects such as video clips, audio clips and images to or from survey recipients.

Another limitation of the prior art is that it has limited analysis capability—only summary reporting for most question types and second order cross-tabulation for rating questions. The prior art cannot support summary tabulation and nth order cross-tabulation with associated graphical display of two or more variables.

Another limitation of the prior art is that is has no interface to databases or existing survey packages. The prior art does not tie in to Object-Relational Databases.

Another limitation of the prior art is that it supports only limited types of questions, and even in the common types of questions supported, it has limited flexibility in adding choice types. Many more question types with the ability to mix-and-match choice types between the base question types are not supported by the prior art.

Another limitation of the prior art is that it does not support "intelligent" survey behavior such as branching or piping. The prior art does not support a survey programming language called "Survey Intermediate Form" which uses common programming language constructs such as macro expansion, conditional and unconditional branching, iterative loops, procedure calls and so forth.

Another limitation of the prior art is that it works only with proprietary e-mail programs. It does not support Internet mail standards such as MIME.

A practical survey network system should provide high-capability in gathering of information across a network. Therefore, what is needed is a high-capability system for performing survey communications across a network.

SUMMARY OF THE INVENTION

One object of the invention is to allow the display of the survey and the response to the survey without requiring a client program to be distributed to and launched from every survey respondent's desktop.

Another object of the invention is to link the survey system to a Web server or Web browser, so that it can be associated with the Web, or it can be unlinked from the Web if required, to make the survey distribution more targeted or more broadcast-like.

Another object is to provide a capability to operate independently of proprietary operating system environments and proprietary windowing environments.

Another object is to provide the capability of associating, delivering or receiving multimedia objects such as video clips, audio clips and images to or from survey recipients.

Another object is to provide greater analysis capability for most question types, such as supporting summary tabulation and nth order cross-tabulation with associated graphical display of two or more variables.

Another object is to provide an interface to databases or existing survey packages and tie in to Object-Relational Databases.

Another object is to provide support for more types of questions, with more flexibility in adding choice types and to allow many more question types with the ability to mix-and-match choice types between the base question types.

Another object is to provide support for "intelligent" survey behavior such as branching or piping and to provide support for survey programming languages using common programming language constructs such as macro expansion, conditional and unconditional branching, iterative loops and procedure calls.

Another object is to support Internet mail standards such as MIME.

The present invention comprises a survey network system for performing surveys across a communications network including a computer network, a questionnaire server, a client and a response processor. The questionnaire server includes a communication interface, a questionnaire library, a questionnaire designer and a questionnaire distributor. The client includes a communication interface, a browser, a response engine and a local dedicated profile. The response processor includes a communication interface, an analysis engine and a prior response database. This provides a high-capability survey network system.

These and other objects of the present invention will become apparent to those skilled in the art from the following detailed description and accompanying drawings.

DETAILED DESCRIPTION OF THE INVENTION

Survey Communication Across a Network

Figure 1:
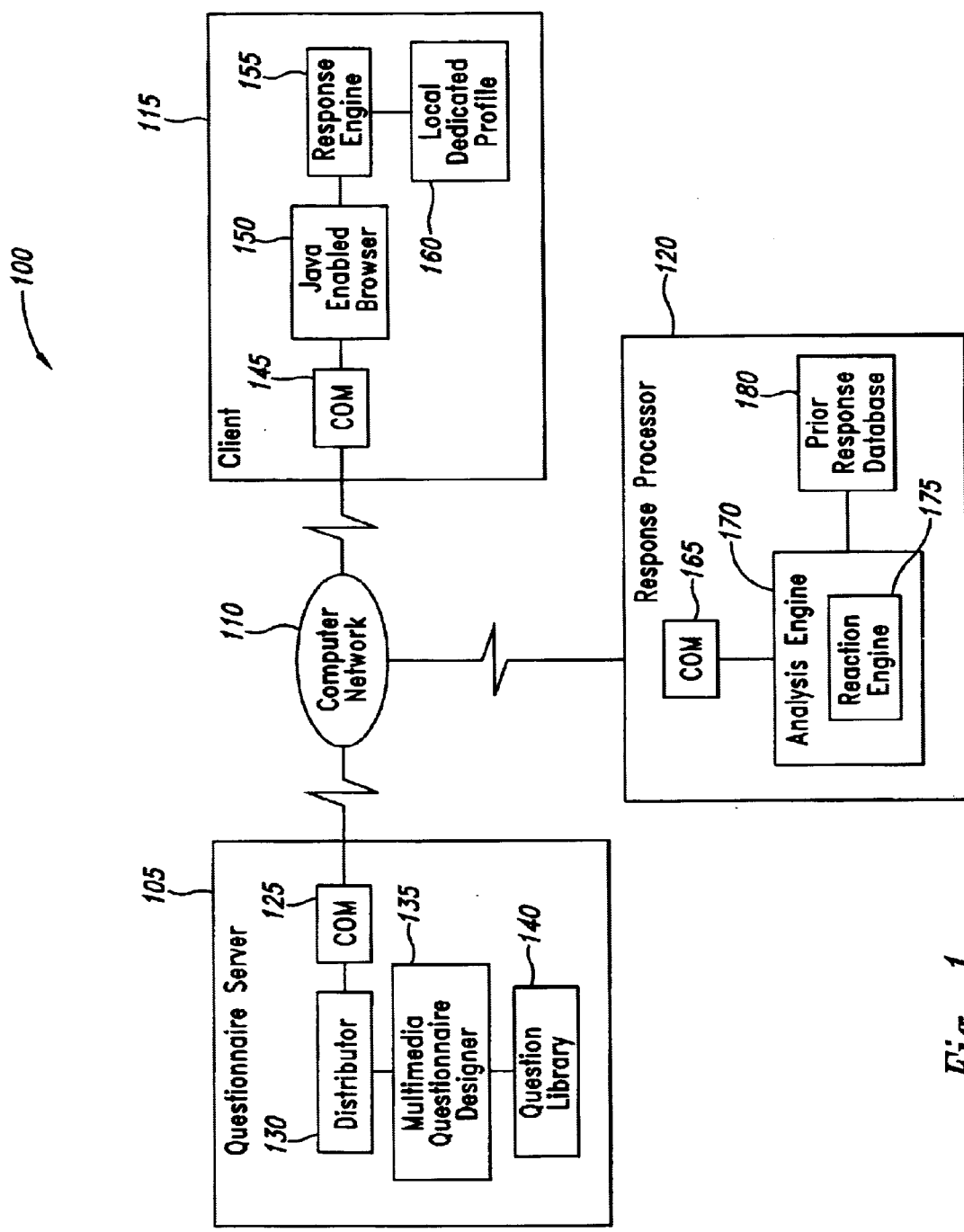
FIG. 1 is a diagram of a survey network system for performing survey communications across a network such as the Internet/World-Wide-Web.

FIG. 1 is a block diagram illustrating a survey network system 100 for performing survey communications across a network 110 such as the Internet/World-Wide-Web. The network system 100 includes a questionnaire server 105 coupled via the computer network 110 to a questionnaire client or client terminal 115 and to a response processor 120.

The server 105 includes a communications interface 125 coupled to a questionnaire distributor 130 coupled in turn to a multimedia questionnaire designer 135 coupled in turn to a questionnaire library 140. The multimedia questionnaire designer 135 enables a user to retrieve multimedia questions from the question library 140 and to generate a multimedia-based questionnaire. Examples of multimedia include text, sound, still images, moving pictures, animation, VRML and hyperlinks to other pieces of information. The distributor 130 uses e-mail or a Web server to forward the questionnaire as a self-configurable applet via the communications interface 125 and network 110 to the client 115.

The client 115 includes a communications interface 145 coupled to a Java®-enabled browser or resident browser program 150 coupled in turn to a response engine 155 coupled in turn to a local dedicated profile 160. The communications interface 145 receives the questionnaire via the computer network 110 from the questionnaire server 105. The Java™-enabled browser 150 enables the client user to read the questionnaire. The response engine 155 enables the user to generate and send a response to the response processor 120. The response may also be multimedia-based. For example, a question may request and the response may include a digital photograph or digital voice sample. The local dedicated profile 160 is a data file storing client user information such as previous responses and user information for authenticating the user. The local dedicated profile 160 may accompany the response for use by the response processor 120.

The response processor 120 includes a communications interface 165 coupled to an analysis engine 170 coupled in turn to a prior response database 180. The communications interface 165 receives the multimedia-based response from the client 115. The analysis engine 170 retrieves relevant prior responses from the prior response database 180 and performs statistical analyses from the prior responses and current response to generate graphical representations such as pie charts or bar graphs of the results. The analysis engine 170 includes a reaction engine 175 to respond to the client by, for example sending to the client 115 a customized information package via e-mail to the client or to other individuals based on the client's specific response or sending an applet which adds additional functionality to an application program operated by the client 115.

Further, the multimedia questionnaire designer 135 may include means for linking questions so that, based on a response, selected questions are presented. That is, based on the response from the client, the questionnaire may include links to present related questions or may include links to skip unnecessary questions. Thus, more realistic dialogues can be achieved. For example, to the question "Do you have a pet?" if a client responds "no" then the question "Would you be interested in buying a pet?" would be appropriate but the question "What type of pet?" would be inappropriate. This process is termed "branching." Also, based on actual prior responses from the client, substitutions in later questions can be provided. For example, if the question is "What is your favorite pet?" and the client responds "dog" then later questions can automatically insert "dog" wherever specifics are requested such as "Why do you like dogs so much?" This process is termed "piping."

Details of the Questionnaire Designer and Distributor

Figure 2:
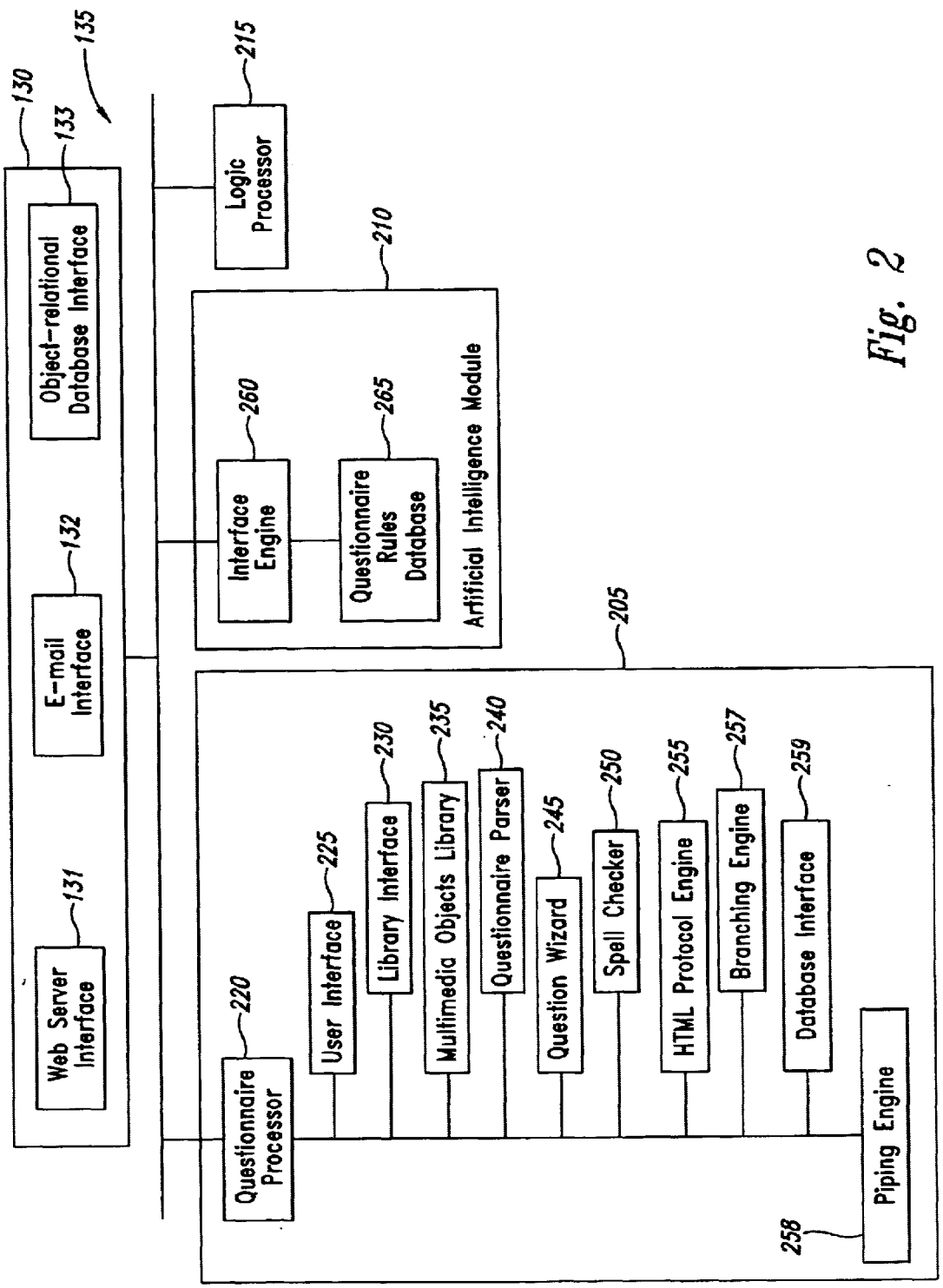
FIG. 2 is a diagram illustrating the details of the questionnaire designer and distributor.

FIG. 2 is a block diagram illustrating details of the distributor 130 and questionnaire designer 135. Questionnaire designer 135 includes a questionnaire editor 205, an artificial intelligence module 210 and a logic processor 215. The questionnaire editor 205 includes a questionnaire processor 220 coupled to a user interface 225, a library interface 230, a multimedia objects library 235, a questionnaire parser 240, a question wizard 245, a spell checker 250, an HTML protocol engine 255 and a branching engine 257. The artificial intelligence module 210 includes an inference engine 260 and a question rules database 265.

The questionnaire editor 205 is much like a conventional word processor that enables a user to generate and format a multimedia-based questionnaire, preferably in outline or graphical form. More particularly, the user interface 225 enables a user to generate questions or to use the library interface 230 to select questions or parts of questions from the question library 140 (FIG. 1). The multimedia objects library 235 enables the user to include multimedia objects in the questionnaire. The questionnaire parser 240 parses the questionnaire for proper grammar. The question wizard 245 examines the syntax of the questions in the questionnaire. The spell checker 250 checks the spelling in the questionnaire. The HTML protocol engine 255 converts the questionnaire to an HTML format for publication on the computer network 110. The branching engine 257 enables the user to link related questions so that, based on real-time responses by a client, only appropriate questions will be presented. The piping engine 258 enables the user to substitute the client responses to prior questions in later questions thus tailoring the wording of later questions to suit the client. The object-relational database interface 259 stores the questionnaire information in a persistent storage area for future retrieval and querying.

The inference engine 260 cooperates with questionnaire editor 205 to use and generate rules in questionnaire rules database 265 for checking question consistency. The logic processor 215 is used to insert links to actions corresponding to the questions for enabling the reaction engine 175 (FIG. 4) to make efficient use of the question responses.

The distributor 130 consists of a Web server interface 131, an e-mail interface 132 and an object-relational database interface 133. The Web server interface 131 enables the questionnaire to be published on a Web site for general deployment whereas the e-mail interface 132 enables the questionnaire to be sent as an e-mail attachment to a targeted audience. The database interface 133 sends information about the distribution (to whom the questionnaire was sent, when it was sent, what are the access passwords to the questionnaire for each respondent, and so on).

Links to multimedia associated with the questionnaire as well as the piping branching and reaction logic are also sent at the time the questionnaire is distributed. When the questionnaire is implemented as a self-configuring Java® applet, it is an intelligent program.

Details of the Client

Figure 3:
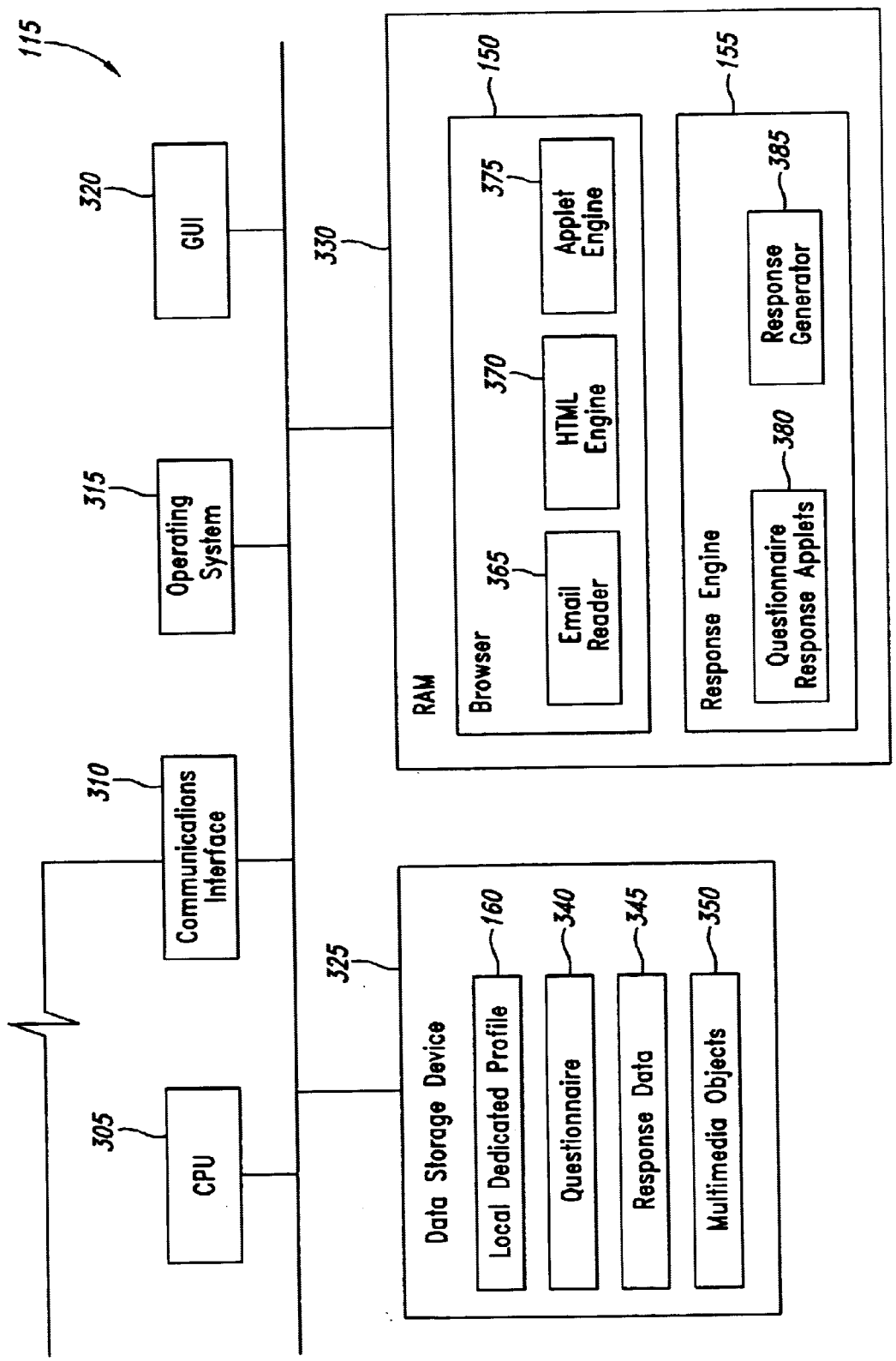
FIG. 3 is a diagram illustrating the details of the client.

FIG. 3 is a block diagram illustrating details of the client 115, which includes a CPU 305, a communications interface 310, an operating system 315, a Graphical User Interface (GUI) 320, a data storage device 325 and random access memory 330.

The data storage device 325 stores the local dedicated profile 160, the questionnaire 340 created by the multimedia questionnaire designer 135, response data 345 for use by the response engine 155 in generating a response, and common multimedia objects 350 such as sound clips, pictures, etc. for use by the response engine 155 when viewing the questionnaire 340.

RAM 330 stores the Java®-enabled browser 150, which includes an e-mail reader 365 for reviewing an e-mail-based questionnaire 340, an HTML engine 370 for reviewing an HTML-based questionnaire 340 and an applet engine 375 for reviewing a Java®-based questionnaire 340.

RAM 330 also stores a response engine 155, which includes questionnaire response applets 380 and a response generator 385. The questionnaire response applets 380 may have been included in the questionnaire 340 by the multimedia questionnaire designer 135 so that the client 115 could easily respond to the questions. For example, if a question were multiple choice, the corresponding questionnaire response applet 380 may, via the applet engine 375, poll for one of the proper responses and add the selected response to the response data 345. Otherwise, the response generator 385 would use a predetermined protocol for generating the response. To control branching, the questionnaire response applets 380 may examine client 115 responses and may instruct the browser 150 to present subsequent questions based on links included in the questionnaire 340. To control piping, the questionnaire response applets 380 may examine the client 115 responses and may instruct the response engine 155 to substitute the specific response to prior questions in later questions.

Analysis Engine of the Response Processor

Figure 4:
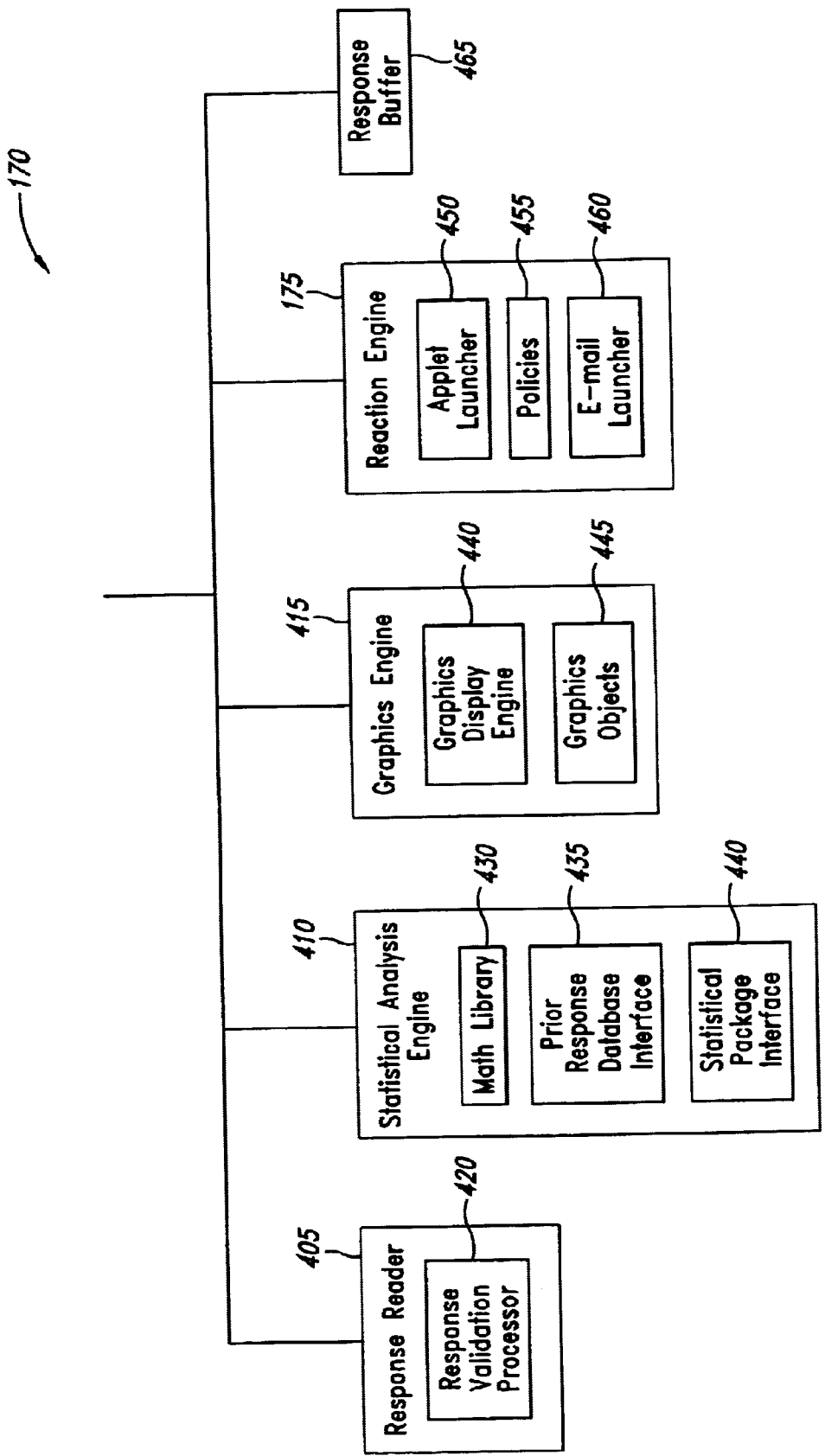
FIG. 4 is a diagram illustrating the details of the analysis engine of the response processor shown in FIG. 1.

FIG. 4 is a block diagram illustrating details of the analysis engine 170 of the response processor 120. The analysis engine 170 includes a response reader 405, a statistical analysis engine 410, a graphics engine 415, a reaction engine 175 and a response buffer 465.

The response reader 405 includes a response validation processor 420 for performing security services to authenticate responses. The statistical analysis engine 410 includes a math library 430 for performing statistical analyses, a prior response database interface 435 for communicating with the prior response database 180 and a statistical package interface 440 for communicating with a commercially available statistical package, for example SAS™ or SPSS™ or a spreadsheet, such as Microsoft Excel™. For example, if the question requested a digital sample of the client 115 user's voice, then the digital sample response is stored in the response buffer 465 for current use and then into the prior response database 180 for future use and analysis. The statistical analysis engine 410 sends its results to the graphics engine 415 and to the reaction engine 175.

The graphics engine 415 includes a graphics display engine 440 for presenting the results as a graphical representation such as a pie chart or bar graph. Graphics engine 415 also includes graphics objects 445 for establishing the proper formats of the graphical representations.

The reaction engine 175 selects and performs a proper reaction to the response or to the results of the statistical analysis. The reaction engine 175 includes policies 455 for selecting the proper reaction based on the response or on the statistical analysis. For example, the reaction engine 175 includes an applet launcher 450 for launching applets to perform the selected reaction. The applets may add additional functionality to the client 115 or may draft a "thank you" letter. The reaction engine 175 also includes an e-mail launcher 460 for forwarding information back to the client 115 or to other individuals to trigger actions that need to be taken based upon the client response. Other modules may be included in the reaction engine 175 for performing other proper reactions.

Those skilled in the art will recognize that the network survey system described above can be implemented with a variety of configurations, depending on the application. Therefore, the present invention is limited only by the following claims.

What is claimed is:

1. A survey system for performing surveys across a communications network, comprising:

a questionnaire server including a questionnaire designer for creating and editing survey questions;

a questionnaire client comprises a response validation processor for performing security services to authentications responses form a digital sample, a local dedicated profile containing user information and said digital sample on the user, and the client terminal allows the survey to access the profile; for receiving said survey questions and generating a response of a user to said survey questions;

a response processor for receiving the response, the response processor including a statistical analysis engine operable to perform a statistical analysis of the response; and a reaction engine for selecting a reaction, including a customized information package or an applet, based on the response or on the statistical analysis, and for sending the reaction to the user or to another individual;

the questionnaire server includes a linking module configured to link survey questions based on a prior response so that selected survey questions are presented based on the prior response by including a link to a related survey question or a link to skip an unnecessary question.

2. The survey system of claim 1, wherein said statistical analysis engine further includes a statistical package interface.

3. The survey system of claim 2, wherein the reaction engine is operable to send information based on the response or on the statistical analysis.

4. The survey system of claim 2, wherein said response processor further comprises:

a prior response database.

5. The survey system of claim 4, wherein said response processor further comprises a communications interface.

6. The survey system of claim 1, wherein said questionnaire server further comprises:
a distributor;
a multimedia objects library; and
a question library.

7. The survey system of claim 6, wherein said questionnaire server further comprises a communications interface.

8. The survey system of claim 1, wherein said questionnaire client comprises:
a browser;
a response engine; and
a local dedicated profile.

9. The survey system of claim 8, wherein said browser is a Java®-enabled browser.

10. The survey system of claim 8, wherein said questionnaire client further comprises a communications interface.

11. The survey system of claim 10, wherein said browser is a Java®-enabled browser.

12. A survey system for performing survey communications across a network, comprising:
a questionnaire server linked through a first communications interface to said network, and including a questionnaire designer for creating and editing survey questions;
a questionnaire client linked through a second communications interface to said network comprises a response validation processor for performing security services to authentications responses form a digital sample and a local dedicated profile containing user information and said digital sample on the user, and the client terminal allows the survey to access the profile, for receiving said survey questions and generating a response to said survey questions; and
a response processor linked through a third communications interface to said network for receiving said response, the response processor including a statistical analysis engine;
the questionnaire server includes a linking module configured to link survey questions based on a prior response so that selected survey questions are presented based on the prior response by including a link to a related survey question or a link to skip an unnecessary question.

13. The survey system of claim 12, wherein said questionnaire server comprises:
a distributor;
a multimedia questionnaire designer, including a questionnaire processor, an artificial intelligence module and a logic processor; and
a question library.

14. The survey system of claim 12, wherein said response processor comprises:
a response buffer;
a response validation processor;
a graphics engine;
a reaction engine; and
a prior response database.

15. The survey system of claim 12, wherein said questionnaire client comprises:
a browser including an e-mail reader, a Web server and an applet engine;
a response engine including a plurality of questionnaire response applets and a response generator; and
a data storage device storing a local dedicated profile, a questionnaire, response data and a plurality of multimedia objects.

16. A computer system for conducting surveys, comprising:
a questionnaire server for sending a survey, the questionnaire server including a questionnaire designer for creating and editing survey questions;
a client terminal having a resident browser program for receiving the survey;
allowing a user to provide a response to the survey;
sending the response;
a response validation processor for performing security services to authentications responses form a digital sample; and
a local dedicated profile containing user information and said digital sample on the user, and the client terminal allows the survey to access the profile;
a response processor for receiving and storing the response, the response processor including a statistical analysis engine operable to perform a statistical analysis of the response;
a reaction engine for selecting a reaction, including a customized information package or an applet, based on the response or on the statistical analysis, and for sending the reaction to the user or to another individual;
the questionnaire server includes a linking module configured to link survey questions based on a prior response so that selected survey questions are presented based on the prior response by including a link to a related survey question or a link to skip an unnecessary question.

17. The system of claim 16, wherein the resident browser program is selected from the group consisting of:
a web browser, an e-mail reader, an HTML engine, and an applet engine.

18. The system of claim 16, wherein the resident browser program can receive a survey that contains multimedia.

19. The system of claim 16, wherein the resident browser program can send a response that contains multimedia.

20. The system of claim 16, wherein said response processor further comprises:
a communications interface which receives the response from the client terminal, and wherein
the analysis engine statistically analyzes the response to generate a survey result, the analysis engine including a statistical package interface for providing the survey result to a statistical package.

21. The system of claim 20, wherein said response processor further comprises a prior response database containing data from at least one prior survey response.

22. The system of claim 20, wherein said analysis engine comprises: a reaction engine for sending a follow-up question to the client terminal based on the received response.

23. The system of claim 16, wherein said questionnaire server further comprises:
a questionnaire library that enables a user to select different styles and types of questions to design the survey; and
a distributor which sends the survey to the client terminal.

24. The system of claim 23, wherein said questionnaire library includes multimedia.

25. A survey system for performing surveys across a communications network, comprising:
a questionnaire server, communicatively coupled to the communications network, for creating survey questions;
a questionnaire client, communicatively, and separately from the server, comprises a response validation processor for performing security services to authentications responses form a digital sample and a local dedicated profile containing user information and said digital sample on the user, and the client terminal allows the survey to access the profile, coupled to the communications network, for receiving the survey questions through the communications network from the questionnaire server, and for generating a response of a user to the survey questions, and a response processor, communicatively, and separately from the server and the client, coupled to the communications network, for receiving the response through the communications network from the questionnaire client, and for, based on the response, sending a reaction, including a customized information package or an applet, through the communications network to the user or to another individual;

the questionnaire server includes a linking module configured to link survey questions based on a prior response so that selected survey questions are presented based on the prior response by including a link to a related survey question or a link to skip an unnecessary question.

26. The survey system of claim 25, wherein the questionnaire server comprises:

a first communications interface that is coupled to the communications network;

a distributor that is coupled to the first communications interface;

a multimedia questionnaire designer; and a question library.

27. The survey system of claim 25, wherein the questionnaire client comprises:

a second communications interface that is coupled to the communications network;

a browser that is coupled to the second communications interface; and a response engine that is coupled to the browser.

28. The survey system of claim 25, wherein the response processor comprises:

a third communications interface that is coupled to the communications network;

an analysis engine that is coupled to the third communications interface; and a prior response database that is coupled to the analysis engine.

* * * * *